United States Patent [19]

Suzuki et al.

[11] Patent Number: 4,672,631
[45] Date of Patent: Jun. 9, 1987

[54] RADIO RECEIVER WITH VARIABLE PHASE SHIFT CORRECTION

[75] Inventors: Eiji Suzuki; Yoshihiro Nozue, both of Tochigi; Kenichi Oide, Utsunomiya, all of Japan

[73] Assignee: Fujitsu Limited, Kawasaki, Japan

[21] Appl. No.: 754,125

[22] Filed: Jul. 12, 1985

[30] Foreign Application Priority Data

Jul. 28, 1984 [JP] Japan .................................. 59-158201

[51] Int. Cl.⁴ .............................................. H03H 7/30
[52] U.S. Cl. .......................................... 375/14; 375/97; 333/18
[58] Field of Search ..................... 375/11, 12, 14, 34, 375/57, 58, 97, 106; 333/18, 28 R; 329/118, 122

[56] References Cited

U.S. PATENT DOCUMENTS

| 3,659,229 | 4/1972 | Milton | 375/14 |
| 3,974,449 | 8/1976 | Falconer | 375/14 |
| 4,295,222 | 10/1981 | Van Uffelen | 375/106 |
| 4,343,759 | 8/1982 | Kustka et al. | 375/14 |

Primary Examiner—Robert L. Griffin
Assistant Examiner—Stephen Chin
Attorney, Agent, or Firm—Staas & Halsey

[57] ABSTRACT

A radio receiver gradually changes the phase of a regenerated clock when an abnormal receiving condition is detected. Since clock phase changes gradually, an equalizer which reduces receiving distortion and a discriminator are periodically synchronized. As a result, if receiving distortion is reduced at this time, the operation of the equalizer and discriminator are normalized and the normal receiving condition can be recovered quickly.

20 Claims, 8 Drawing Figures

RADIO RECEIVER WITH VARIABLE PHASE SHIFT CORRECTION

BACKGROUND OF THE INVENTION

The present invention relates to a radio receiver and, more particularly, to a digital radio receiver which phase shifts its regenerated clock when an abnormal receiving condition is detected.

In general, an equalizer, for example a transversal filter, is used before or after signal detection in order to reduce distortion which occurs due to fading in radio communication. In this case, the parameters of the equalizer (for example, the tap coefficients of the transversal filter), are controlled on the basis of a signal condition before or after the equalization. If the distortion in the received signal exceeds the capability of the equalizer, an abnormal condition occurs, so that the error rate of discriminated data is deteriorated, and the carrier or clock cannot be regenerated. As a result, synchronization of the discrimination or equalization is destroyed. Under this condition, the parameters of the equalizer are altered and the correct values can no longer be recovered even after the distortion in the received signal is reduced so that it returns to a level at which equalization can take place normally. Therefore, in the prior art, when this type of abnormal condition is detected, the parameters of the equalizer are reset and are controlled again when the receiving condition has been recovered and the clock has been regenerated.

Figure 1:
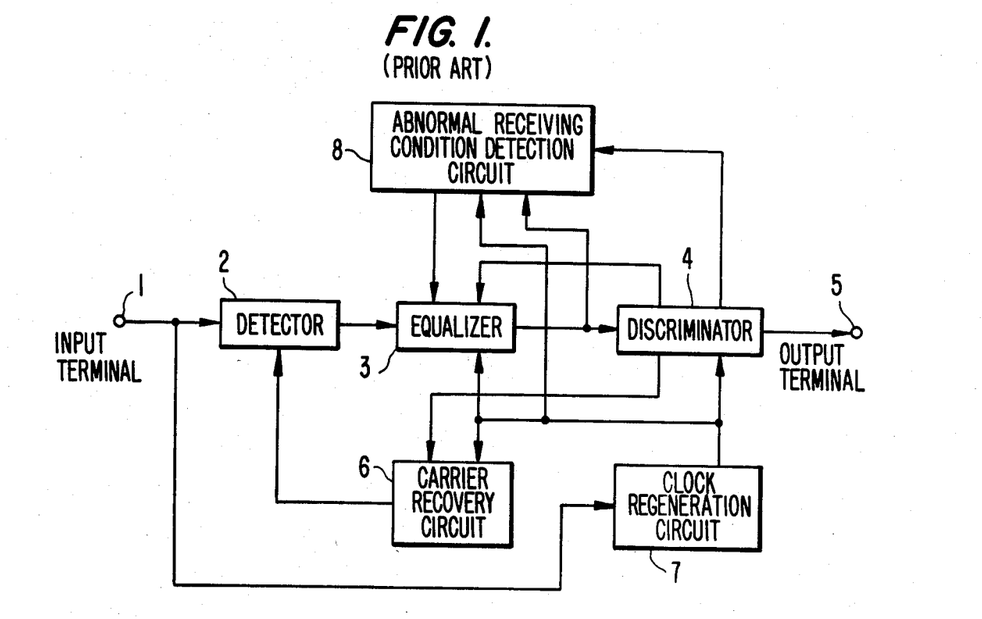
FIG. 1 is a block diagram of a part of a prior art radio receiver.

FIG. 1 is a block diagram of a part of a prior art radio receiver. A signal which is received and converted to the intermediate frequency is input to an input terminal 1. The intermediate frequency signal is converted, in a detector 2, to a baseband frequency signal by a recovered carrier sent from a carrier recovery circuit 6, equalized in an equalizer 3, and discriminated in a discriminator 4 to the nearest level from among plural reference levels. Finally, the signal is output to an output terminal 5 as output data.

The parameters of the equalizer 3 (for example, the tap coefficients of a transversal filter) are controlled by the discrimination result of the discriminator 4. A clock regeneration circuit 7 regenerates the clock from the intermediate frequency signal and sends it to discriminator 4, an abnormal receiving condition detection circuit 8, equalizer 3 and carrier recovery circuit 6.

The abnormal receiving condition detection circuit 8 monitors an error rate from the output of the discriminator 4, and resets the parameters of equalizer 3 when it determines that the receiving condition is abnormal. After the parameters are reset, equalizer 3 stops its operation.

As explained above, in the prior art, the parameters of the equalizer are reset when an abnormal receiving condition is detected and, therefore, a data signal cannot be received normally until synchronization is obtained under the nonequalized condition. As a result, the line application rate (i.e., the number of users per unit time) is deteriorated and the system has a greater amount of down time.

SUMMARY OF THE INVENTION

It is an object of the present invention to provide a radio receiver which can be recovered from an abnormal condition quickly.

It is another object of the present invention to provide a radio receiver which can raise the line application rate and can lower the total cost of the communication system.

In the present invention, a receiver gradually changes a regenerated clock phase when an abnormal receiving condition is detected. Since the clock phase changes gradually, the equalizer and discriminator are periodically synchronized with the sending side. As a result, if distortion in the received signal is reduced at this time, the operations of the equalizer and discriminator are normalized and thereafter normal receiving conditions can be continued.

In particular, the radio receiver of the present invention includes equalization means for equalizing a received signal and for reducing distortion which is included in the received signal; clock regeneration means for regenerating a clock from an input signal; abnormal receiving condition detection means for detecting an abnormal condition in the received signal; and variable phase shift means, operatively connected to said clock regeneration means, for variably phase shifting the regenerated clock when the abnormal receiving condition detection means detects an abnormal receiving condition. The variable phase shift means includes means for sweeping the regenerated clock so as to determine a clock phase for equalization. The variable phase shift means may include an LC circuit having a variable capacitance element or a one-shot multivibrator capable of varying its hold time.

Alternatively, the variable phase shift means may include a first hybrid circuit for dividing the regenerated clock provided by the clock regeneration means into two output signals having a phase difference of 90°; mixers, operatively connected to the abnormal receiving condition detection means and the first hybrid circuit, for multiplying a sine wave signal and a cosine wave signal output by the abnormal receiving condition detection means times the output signals of the first hybrid circuit; and a second hybrid circuit for combining the multiplied signals output by the mixers and for outputting a phase shifted regenerated clock.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 2:
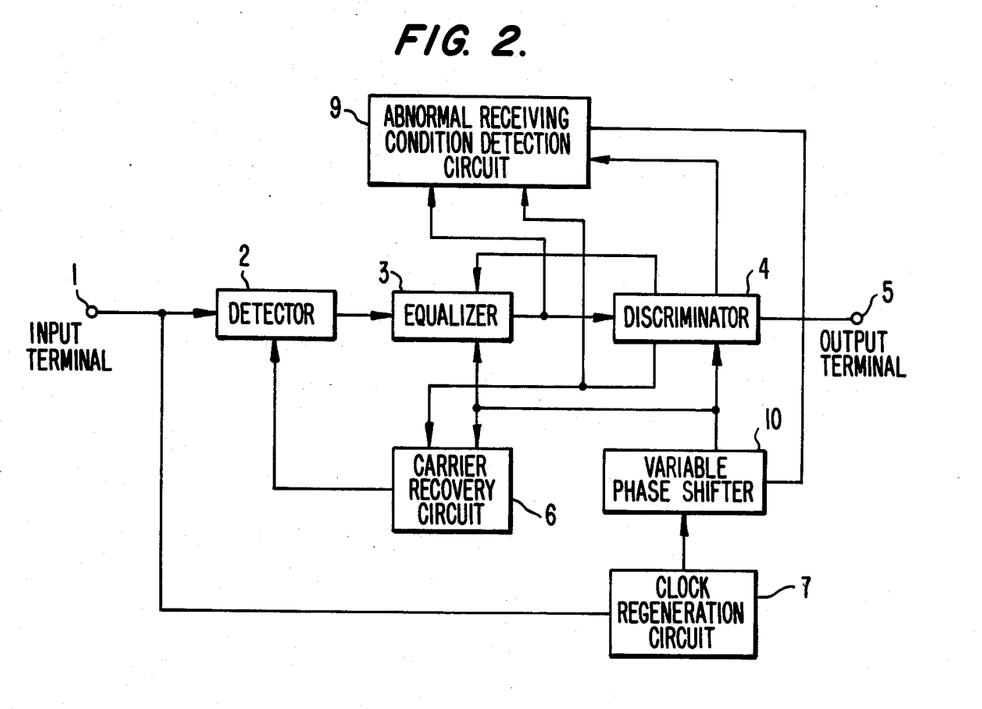
FIG. 2 is a block diagram of a first embodiment of a part of a radio receiver in accordance with the present invention.

FIG. 2 is a block diagram of a radio receiver in accordance with an embodiment of the present invention. An intermediate frequency signal is input to input terminal 1, converted to a baseband frequency signal by detector 2, equalized in equalizer 3 to reduce the distortion, discriminated by discriminator 4 and then output to output terminal 5 as output data. The carrier recovery circuit 6 recovers a carrier signal from the discriminated data output by the discriminator 4, and then sends the recovered carrier signal to detector 2. A clock regeneration circuit 7 regenerates the clock from the input intermediate frequency signal and sends it, via a variable phase shifter 10, to equalizer 3, discriminator 4, an abnormal receiving condition detection circuit 9 and carrier recovery circuit 6. The abnormal receiving condition detection circuit 9 monitors the discriminated data output by discriminator 4 and gradually changes the phase shift of variable phase shifter 10 when the error rate exceeds a predetermined value and the receiving condition is determined to be abnormal.

Figure 3:
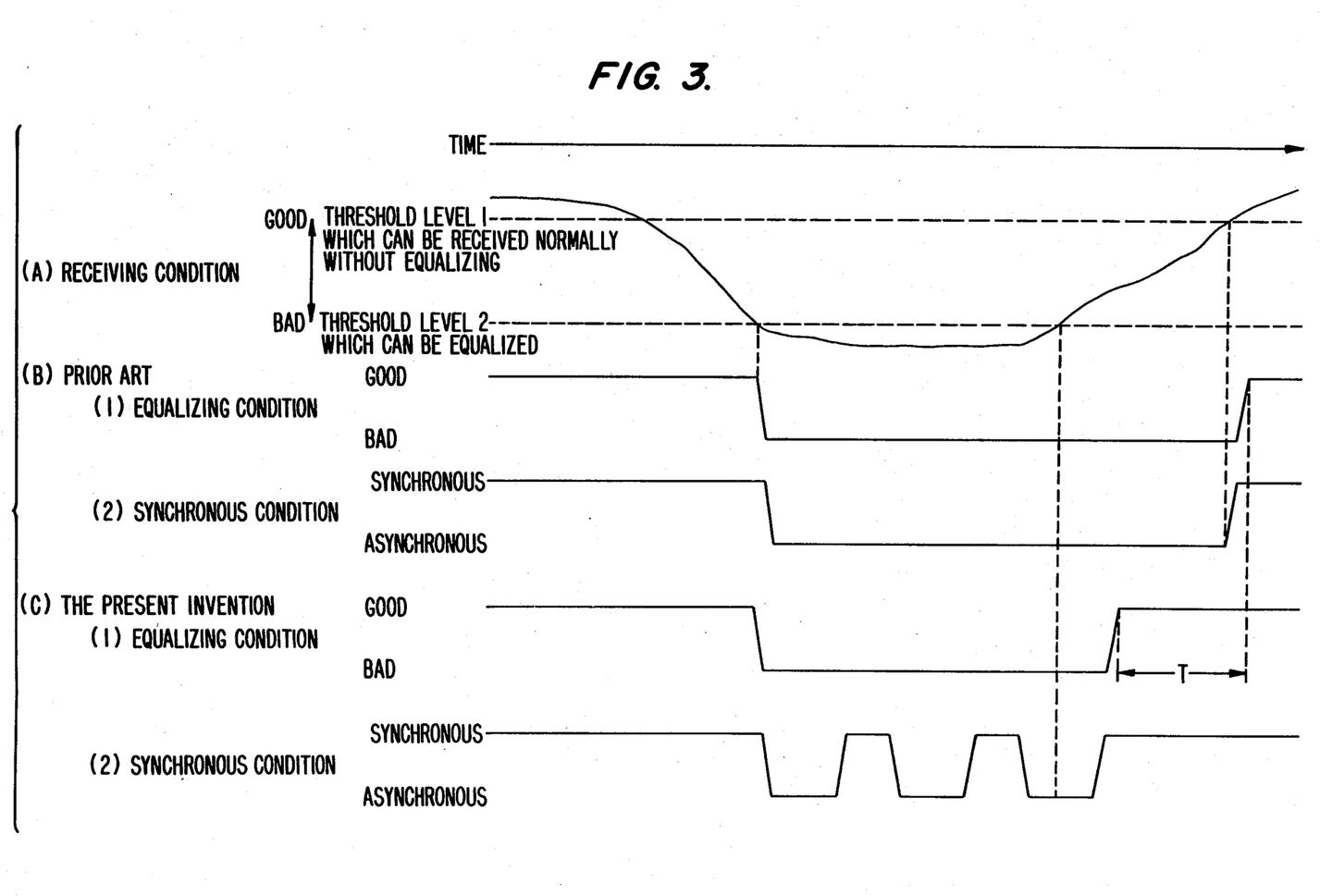
FIG. 3 is a time chart for explaining the operational differences between the prior art and the present invention.

FIG. 3 is a time chart of the relationship between the receiving condition (FIG. 3(A)) and receiver operation for the present invention (FIG. 3(C)) and the prior art (FIG. 3(B)). FIG. 3(A) shows the receiving condition, wherein the upper dotted line indicates a threshold level 1 for normal reception (i.e., the clock can be regenerated) without equalizing. The lower dotted line indicates a threshold level 2 for reception which can be equalized. FIG. 3(B) illustrates the operation of a prior art radio receiver. For the operation of the prior art radio receiver, (B)(1) is for an equalizing condition and (B)(2) is for a synchronous condition. As illustrated in FIG. 3(B), even after the receiving condition falls below the threshold level 1, the synchronous condition (B)(2) is maintained because equalizing condition (B)(1) remains good and distortion is reduced by equalization. However, after the receiving condition falls below the threshold level 2, the equalizing condition (B)(1) turns bad and the receiver becomes asynchronous. Then, only after the receiving condition (FIG. 3(A)) rises over the threshold level 1 and the synchronous condition (B)(2) is recovered, does the equalizing condition (B)(1) become good. On the other hand, in the present invention (FIG. 3(C)), after the equalizing condition (C)(1) becomes bad and the synchronous condition (C)(2) is destroyed, a regenerated clock is swept and the synchronous condition (C)(2) is periodically synchronized. Therefore, after receiving condition (A) exceeds the threshold level 2, synchronous condition (C)(2) is recovered and the equalizing condition (C)(1) is normalized. As explained above, in the present invention, it is not necessary to return to the threshold level 1 for normal receiving; therefore, it is possible to reduce the time for normalization of the equalizing condition (C)(1) by a time T compared with the prior art.

Figure 4:
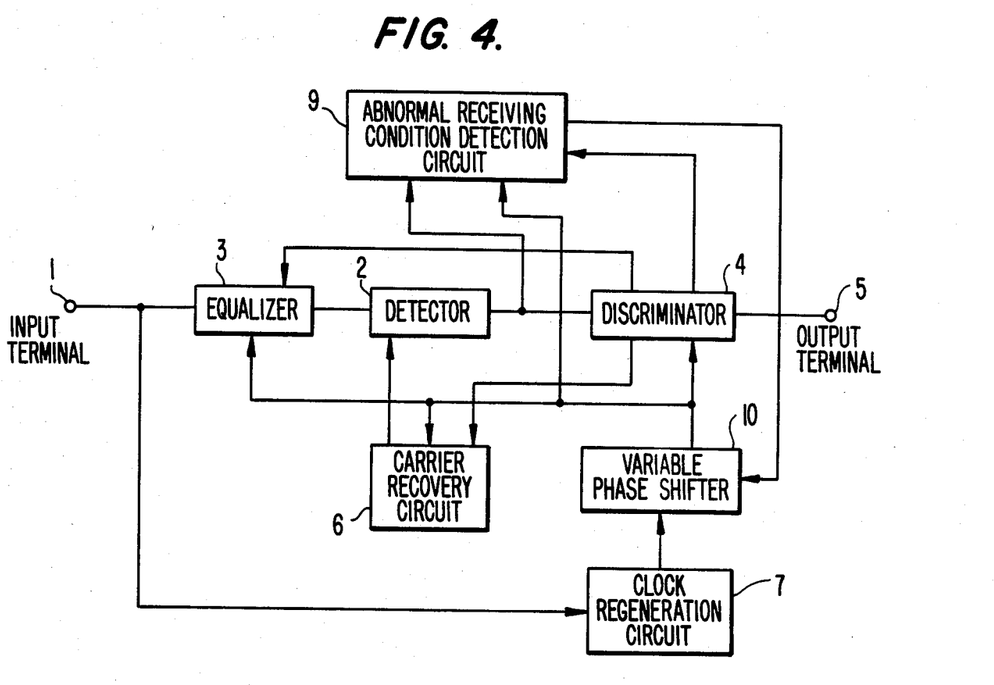
FIG. 4 is a block diagram of a second embodiment of the present invention.

FIG. 4 is a block diagram of another embodiment of the present invention. The only difference between FIGS. 4 and 2 is that an equalizer 3' equalizes the intermediate frequency signal sent from the input terminal 1 instead of the baseband frequency signal output by the detector 2. The operation of the circuits is the same as for the case of FIG. 2.

Figure 5:
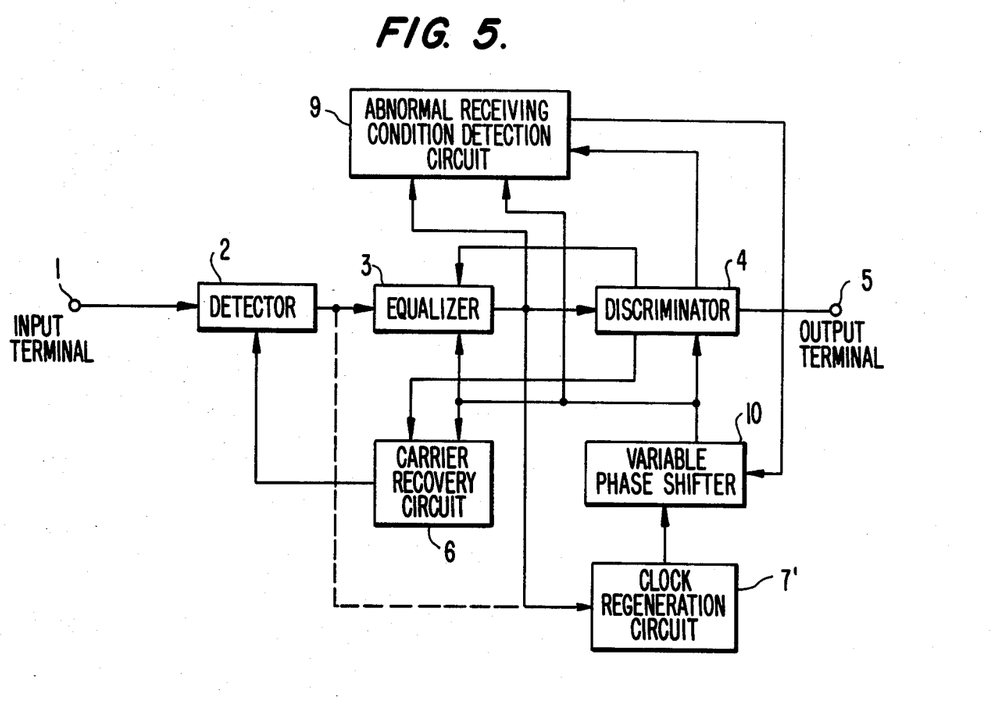
FIG. 5 is a block diagram of a third embodiment of the present invention.

As described above with respect to FIG. 2, the clock is regenerated from the input intermediate frequency signal. However, the receiver of the present invention is not limited to that case. In particular, the clock can be regenerated from the baseband frequency signal, or the output of detector 2 or equalizer 3, as illustrated in FIG. 5. However, in the case of regeneration from the output of equalizer 3, the feedback loop for regenerating the clock and the feedback loop for equalization form a double feedback loop system. This double feedback loop makes the system susceptible to instability.

Figure 6:
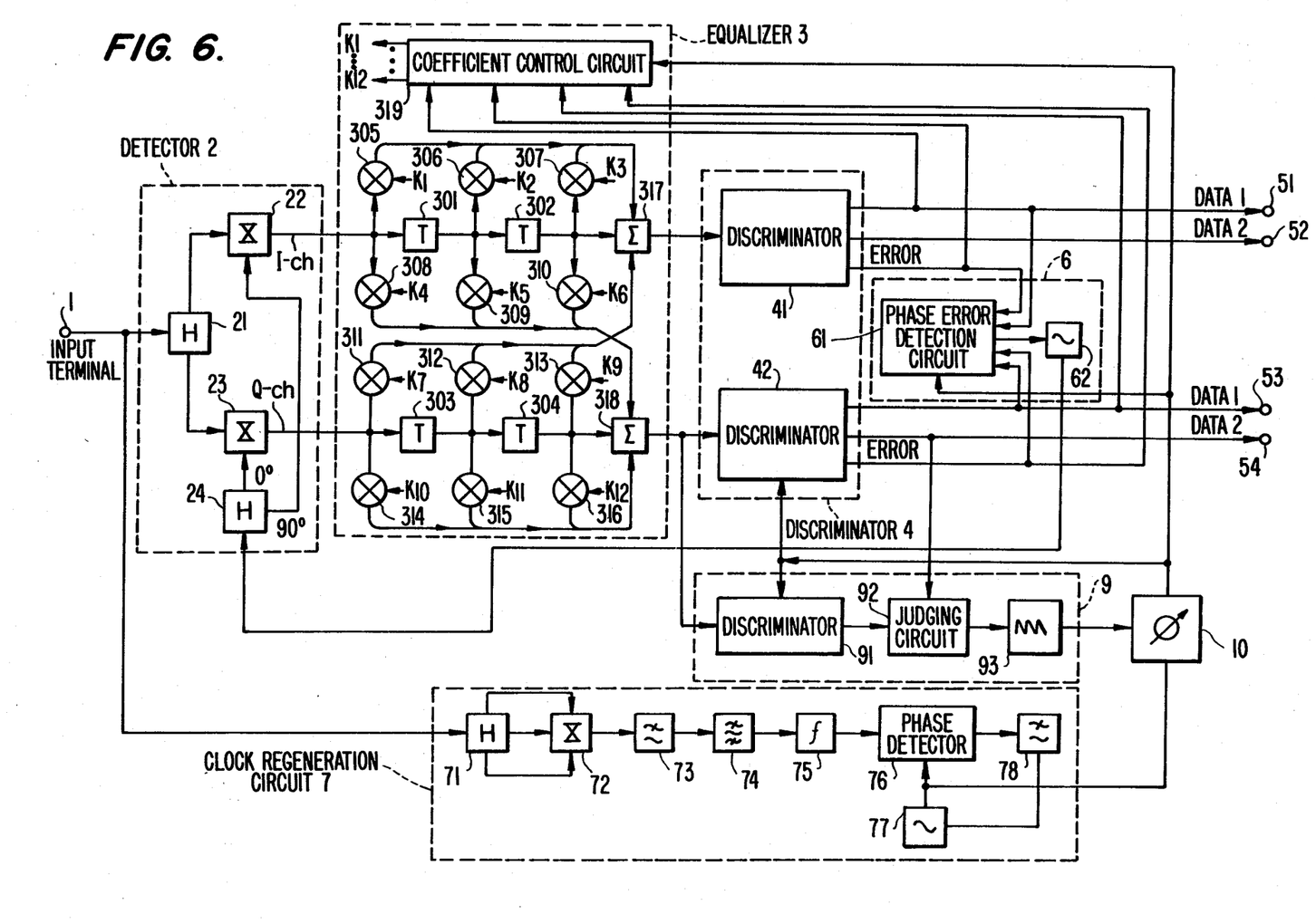
FIG. 6 is a detailed block diagram of the embodiment of FIG. 2.

FIG. 6 is a block diagram of the details of FIG. 2 as adapted for a 16-value QAM (quadrature amplitude modulation) radio receiver. In FIG. 6, detector 2 divides the input signal into two signals using a hybrid circuit 21, and divides the recovered carrier sent from carrier recovery circuit 6 into two signals having a phase difference of 90° using a 90° hybrid circuit 24. The detector 2 respectively mixes the two signals output by hybrid circuit 21 with the two signals output by hybrid circuit 24 using mixers 22 and 23, and obtains an I-channel signal (I-ch) and a Q-channel signal (Q-ch).

Equalizer 3 comprises a transversal filter including delay circuits 301 and 302 which are connected in series for delaying the I-channel signal. The transversal filter includes multipliers 305 to 310 which multiply coefficients ($K_1$ to $K_6$, respectively) times the respective signals at the three nodes at the input of delay circuit 301, the output of delay circuit 301, and the output of delay circuit 302. Delay circuits 303 and 304 are connected for receiving the Q-channel signal, and multipliers 311 to 316 are connected in a manner similar to the connections for the I-channel signal. An adder 317 adds the outputs from multipliers 305, 306, 307, 311, 312 and 313 and provides an equalized I-channel output. An adder 318 adds the outputs from multipliers 308, 309, 310, 314, 315 and 316 and outputs an equalized Q-channel output. Finally, the transversal filter includes a coefficient control circuit 319 which changes the coefficients $K_1 \ldots K_{12}$ in order to eliminate intersymbol interference and interchannel interference of the I-channel signal and the Q-channel signal.

Discriminator 4 in FIG. 6 comprises a discriminator 41 for discriminating the I-channel signal and a discriminator 42 for discriminating the Q-channel signal. Each of the discriminators 41, 42 executes A/D conversion for the equalized outputs (baseband frequency signal) in synchronization with the clock, and outputs 2-bit data (DATA 1 and DATA 2) and an error signal (ERROR) which indicates an error between the intrinsic voltage of the signal discriminated by the data and the actual input signal. The respective 2-bit data (DATA 1 and DATA 2) of the I-channel signal and the Q-channel signal are output to output terminals 51 to 54. The first data bits (DATA 1) and the error signals (ERROR) are output to the coefficient control circuit 319 of equalizer 3.

Carrier recovery circuit 6 is composed of a phase error detection circuit 61 and a voltage controlled oscillator 62 which is controlled by the phase error detection circuit 61 and outputs the recovered carrier to the detector 2.

Clock regeneration circuit 7 comprises a hybrid circuit 71, a mixer 72 and a low-pass filter 73 which together square the input intermediate frequency signal and extract a baseband component. A bandpass filter 74 extracts a clock frequency component, a limiter 75 generates a rectangular wave output based on the filtered clock frequency component, and a phase detector 76 detects the phase difference between the rectangular wave output and the regenerated clock. A low-pass filter 78 outputs a low frequency component of the detected output, and a clock oscillator 77 is controlled by this low frequency component to output the regenerated clock. The regenerated clock is also output, via the variable phase shifter 10, to discriminator 4, coefficient control circuit 319, carrier recovery circuit 6 and abnormal receiving condition detection circuit 9.

The abnormal receiving condition detection circuit 9 is composed of a discriminator 91 which executes A/D conversion for the equalized Q-channel output at a timing which is shifted slightly from the determined discrimination timing. A judging circuit 92 measures the frequency with which the lower bit of discriminator 91 differs from the lower bit of the discriminator 42 (DATA 2) and determines when it has exceeded a predetermined value. A low frequency oscillator 93 generates a low frequency sawtooth wave for gradually changing the phase shift of variable phase shifter 10 when the above determination is made by the judging circuit 92. The variable phase shifter 10 is formed by an LC circuit having a variable capacitance element or a one-shot multivibrator which is capable of varying its hold time.

When a signal is received normally (with a low amount of distortion), the I-channel and Q-channel baseband frequency signals are detected by detector 2, equalized by equalizer 3 comprising the transversal filter for removing the distortion, and converted to output data by discriminator 4. In this case, the discriminating time must be synchronized to the sending side because equalization and carrier recovery are carried out based on the discriminated data. If distortion in the received signal increases due to, for example fading, equalization, carrier recovery and clock regeneration are no longer carried out correctly because the distortion exceeds the capability of equalizer 3. As a result, synchronization with the sending side is destroyed and the normal baseband frequency signal cannot be obtained. The abnormal receiving condition detection circuit 9 detects such an abnormal receiving condition by determining that the frequency with which the result of discrimination at the predetermined time varies from the result of discrimination at a point shifted slightly from the predetermined time, by an amount which exceeds the predetermined value. A low frequency sawtooth wave is output to variable phase shifter 10 in order to gradually change the clock phase. The amplitude of the sawtooth wave is set for indicating the phase shift of variable phase shifter 10 in a range from 0° to 360°. As a result, the discriminating time is synchronized periodically to the sending side. When distortion due to, for example fading, is reduced, equalization, carrier recovery and clock regeneration are sequentially carried out in synchronization with the sending side, and thereafter synchronization with the sending side is maintained by clock regeneration circuit 7. The abnormal receiving condition detection circuit 7 stops the output of the low frequency signal to the variable phase shifter 10 when the normal receiving condition is recovered.

Figure 7:
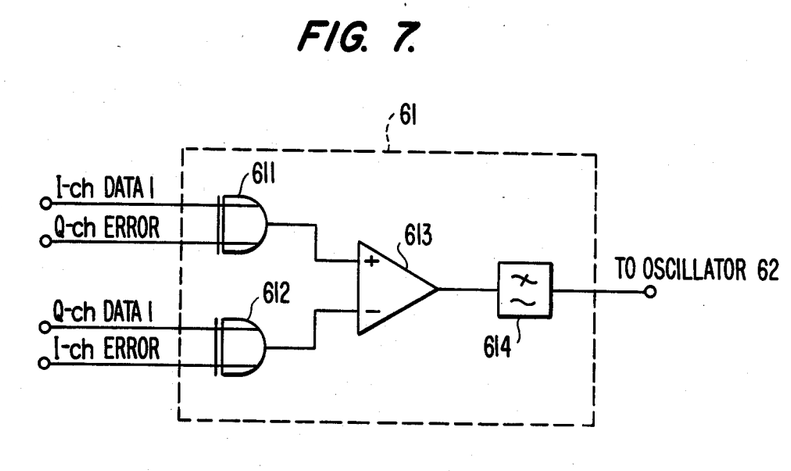
FIG. 7 is a block diagram of an embodiment of the phase error detection circuit 61 which is a part of carrier recovery circuit 6 (FIG. 6)

FIG. 7 is a circuit diagram of an embodiment of the phase error detection circuit 61 shown in FIG. 6. As shown in FIG. 7, phase error detection circuit 61 comprises EX-OR logic circuits 611 and 612, a differential amplifer 613 and a low-pass filter 614. The EX-OR logic circuits 611 and 612 detect how an eye-pattern of a received signal is closed by intersymbol inteference of the I-channel and Q-channel signals. Differential amplifier 613 eliminates an amplitude component of the 16-value QAM signal and extracts only a rotation component. Low-pass filter 614 can be, for example, a so-called lag-lead type loop filter, and it extracts a low frequency component which controls the oscillating frequency of oscillator 62.

Figure 8:
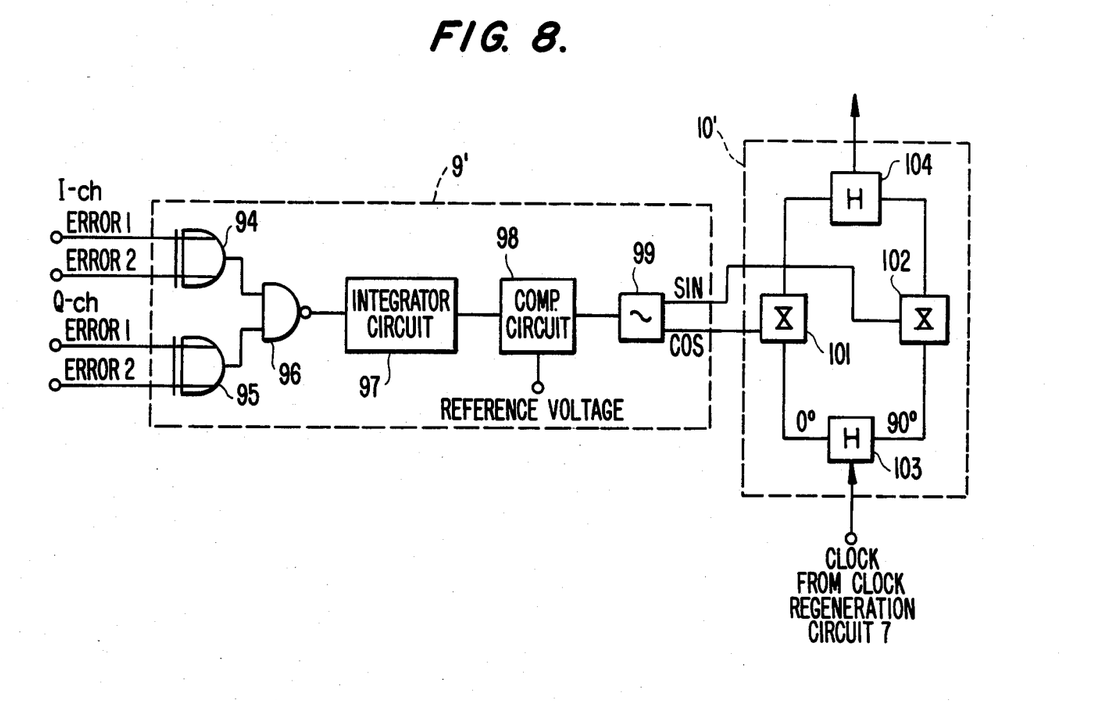
FIG. 8 is a block diagram of alternate embodiments of the abnormal receiving condition detection circuit 9 and the variable phase shifter 10 of FIGS. 2, 4 and 5.

FIG. 8 is a block diagram of another embodiment of the abnormal receiving condition detection circuit 9 and variable phase shifter 10. In FIG. 8, abnormal receiving condition detection circuit 9' receives multilevel error signals from discriminator 4 for each of the I-channel and Q-channel signals. Such multi-level error signals can be provided by a discriminator 4 which includes an analog-to-digital converter which samples a multi-level signal with an accuracy greater than the accuracy at which the transmitting system coverted the data into the multi-level signal. EX-OR logic circuits 94 and 95 and NAND circuit 96 form an error monitoring circuit which uses this extra error signal. U.S. application Ser. No. 740,326, filed June 3, 1985, by one of the inventors of the present invention, the disclosure of which is hereby incorporated by reference, is directed to such an error monitoring circuit.

The error monitoring information from the NAND circuit 96 is provided to an integrator circuit 97. The result of integration by the integrator circuit 97 is compared with a reference voltage by comparator circuit 98. Then, if the result of integration is larger than the reference voltage, comparator circuit 98 determines that the receiving condition is abnormal and a drive oscillator 99 changes the phase shift of variable phase shifter 10'. Variable phase shifter 10' is controlled by sine wave and cosine wave signals from drive oscillator 99. In other words, the phase shift of variable phase shifter 10' is determined by sine wave and cosine wave signal components output by drive oscillator 99. Variable phase shifter 10' comprises a 90° hybrid circuit 103 which divides the regenerated clock into two signals having a phase difference of 90°. A mixer 101 multiplies the 0° clock by the cosine wave component sent from oscillator 99, and a mixer 102 multiplies the 90° clock by the sine wave component. A hybrid circuit 104 combines the outputs of mixers 101 and 102 to provide the output signal of the variable phase shifter 10'.

As explained above, since the phase which is synchronized with the sending side is searched for by changing the phase of the clock when an abnormal receiving condition is detected, the receiving condition can be quickly recovered to the normal condition when distortion in the received signal is reduced.

The many features and advantages of the invention are apparent from the detailed specification and, thus, it is intended by the appended claims to cover all such features and advantages of the circuit which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A radio receiver for receiving an input signal, comprising:

equalization means for equalizing a received signal corresponding to the input signal and for reducing distortion which is included in the received signal to produce an equalized signal;

clock regeneration means for regenerating a clock from the input signal;

abnormal receiving condition detection means for detecting an abnormal condition in the equalized signal; and variable phase shift means, operatively connected to said clock regeneration means and said equalization means, for variably phase shifting the regenerated clock and for providing the variably phase shifted regenerated clock to said equalization means when said abnormal receiving condition detection means detects an abnormal receiving condition.

2. A receiver according to claim 1, further comprising:

an input terminal for receiving the input signal; and detection means, operatively connected between said input terminal and said equalization means, for detecting the input signal and for providing the received signal to said equalization means.

3. A receiver according to claim 1, further comprising an input terminal for receiving the input signal, wherein said clock regeneration means is operatively connected to the input terminal for regenerating the clock from the input signal.

4. A receiver according to claim 1, wherein said variable phase shift means includes means for sweeping the regenerated clock so as to determine a clock phase at which said equalization means can be operated.

5. A radio receiver for receiving an intermediate frequency signal, comprising:

input terminal means for receiving the intermediate frequency signal;

detector means, operatively connected to said input terminal means, for detecting the intermediate frequency signal and for providing a baseband frequency signal;

equalization means, operatively connected to said detector means, for equalizing the baseband frequency signal which is provided by said detector means, and for reducing distortion in the baseband frequency signal;

discrimination means, operatively connected to said equalization means, for discriminating the equalized signal, and for outputting a data signal;

carrier recovery means, operatively connected to said discrimination means and said detector means, for recovering a carrier signal from the data signal, and for providing the recovered carrier signal to said detector means, said detector means detecting the intermediate frequency signal based on the recovered carrier signal;

abnormal receiving condition detection means, operatively connected to said discrimination means, for detecting an abnormal receiving condition based on the data signal;

clock regeneration means, operatively connected to said input terminal means, for regenerating a clock from the intermediate frequency signal; and variable phase shift means, operatively connected to said discrimination means, said clock regeneration means and said abnormal receiving condition detection means, for variably phase shifting the regenerated clock and for providing the shifted regenerated clock to said discrimination means when said abnormal receiving condition detection means detects an abnormal receiving condition.

6. A receiver according to claim 5, wherein the baseband frequency signal includes channel signals, and wherein said equalization means comprises a transversal filter which includes:

sets of delay circuits connected to each detector means, each of the delay circuits within a set being connected in series and each having an input and an output, each of said sets of delay circuits for delaying a respective one of the channel signals;

multipliers, connected to said delay circuits, for multiplying respective coefficients times the signals at the respective inputs and outputs of said delay circuits;

adders connected to said multipliers and to predetermined ones of said delay circuits, for adding predetermined ones of the output signals of said delay circuits and the outputs of said multipliers; and a coefficient control circuit, connected to said discrimination means and said multipliers, for controlling the coefficients in order to reduce intersymbol interference and interchannel interference.

7. A receiver according to claim 5, wherein said abnormal receiving condition detection means comprises:

a discriminator, connected to said equalization means, for discriminating the equalized signal at a timing which is offset from the discrimination timing of said discrimination means;

a judging circuit, connected to said discriminator and to said discrimination means, for determining that an abnormal receiving condition exists by measuring the frequency at which the output of said discriminator is different from the output of said discrimination means; and a low frequency oscillator, connected to said judging circuit, for generating a low frequency sawtooth wave to gradually vary the phase shift of said variable phase shift means when the judging circuit determines that an abnormal receiving condition exists.

8. A receiver according to claim 7, wherein said variable phase shift means comprises an LC circuit having a variable capacitance element.

9. A receiver according to claim 7, wherein said variable phase shift means comprises a one-shot multivibrator having a variable hold time.

10. A receiver according to claim 5, wherein the equalized signal is a multi-level signal, wherein said discrimination means includes analog-to-digital conversion means for sampling the multi-level signal with an accuracy greater than the accuracy at which the multi-level signal was converted from data by a transmitter and for producing, as the data signal, data and error detection data, and wherein said abnormal receiving condition detection means includes:

EXCLUSIVE OR circuits operatively connected to said analog-to-digital conversion means;

a NAND circuit connected to said EXCLUSIVE OR circuits;

an integrator circuit, connected to said NAND circuit, for integrating the output of said NAND circuit;

a comparator circuit, connected to said integrator circuit, for comparing the integrated output with a reference voltage, and for determining whether an abnormal receiving condition exists; and an oscillator, connected to said comparator circuit and said variable phase shift means, for generating an oscillating control signal for said variable phase shift means when an abnormal receiving condition exists.

11. A receiver according to claim 10, wherein said oscillator generates a sine wave signal and a cosine wave signal as the oscillating control signal, and wherein said variable phase shift means comprises:
a first hybrid circuit, operatively connected to said clock regeneration means, for dividing the regenerated clock provided by said clock regeneration means into two output signals having a phase difference of 90°;
mixers, operatively connected to said oscillator and said first hybrid circuit, for respectively multiplying the sine wave signal and the cosine wave signal times the two output signals of said first hybrid circuit; and
a second hybrid circuit, operatively connected to said mixers, for combining the multiplied signals and for outputting the phase shifted regenerated clock.

12. A radio receiver for receiving an input signal having distortion, comprising:
first means for detecting the input signal, for equalizing the input signal to reduce the distortion, and for providing an equalized signal;
second means for regenerating a clock based on the input signal;
third means, operatively connected to said first means, for discriminating the equalized signal and for generating a data signal;
fourth means, operatively connected to said third means, for detecting an abnormal condition in the input signal based on the data signal; and
fifth means, operatively connected to said first means, said second means and said fourth means, for variably phase shifting the regenerated clock when said fourth means detects an abnormal condition and for providing the variably phase shifted regenerated clock to said first means.

13. A receiver according to claim 12, wherein said fifth means includes means for sweeping the regenerated clock so as to determine a clock phase at which said first means can be operated.

14. A receiver according to claim 12, wherein said fifth means comprises an LC circuit having a variable capacitance element.

15. A receiver according to claim 14, wherein said fourth means comprises:
a discriminator, operatively connected to said first means and said third means, for discriminating the equalized signal at a timing which is offset from the timing of said third means;
a judging circuit, operatively connected to said discriminator and said third means, for determining whether an abnormal condition exists by measuring the frequency with which the output of said discriminator is different from the data signal generated by said third means; and
a low frequency oscillator, operatively connected to said judging circuit and said LC circuit, for generating a low frequency sawtooth wave to gradually vary the phase shift of said LC circuit when said judging circuit determines that an abnormal condition exists.

16. A receiver according to claim 12, wherein said fifth means comprises a one-shot multivibrator having a variable hold time.

17. A receiver according to claim 16, wherein said fourth means comprises:
a discriminator, operatively connected to said first means and said third means, for discriminating the equalized signal at a timing which is offset from the timing of said third means;
a judging circuit, operatively connected to said discriminator and said third means, for determining whether an abnormal condition exists by measuring the frequency with which the output of said discriminator is different from the data signal generated by said third means; and
a low frequency oscillator, operatively connected to said judging circuit and said one-shot multivibrator, for generating a low frequency sawtooth wave to gradually vary the phase shift of said one-shot multivibrator when said judging circuit determines that an abnormal condition exists.

18. A receiver according to claim 12, wherein said fifth means comprises:
a first hybrid circuit, operatively connected to said second means, for dividing the regenerated clock into two output signals having a phase difference of 90°;
first and second mixers, operatively connected to said fourth means and said first hybrid circuit, for multiplying the abnormal condition detection signal by the two output signals of said first hybrid circuit; and
a second hybrid circuit, operatively connected to said first and second mixers and said first means, for combining the multiplied signals and for outputting the variably phase shifted regenerated clock.

19. A receiver according to claim 18, wherein the equalized signal is a multi-level signal, wherein said third means includes analog-to-digital conversion means for sampling the multi-level signal with an accuracy greater than the accuracy at which the multi-level signal was converted from data by a transmitter and for producing, as the data signal, data and error detection data, and wherein said fourth means includes:
first and second EXCLUSIVE OR circuits operatively connected to said analog-to-digital conversion means;
a NAND circuit connected to said first and second EXCLUSIVE OR circuits;
an integrator circuit, connected to said NAND circuit, for integrating the output of said NAND circuit;
a comparator circuit, connected to said integrator circuit, for comparing the integrated output with a reference voltage and for determining whether an abnormal condition exists; and
an oscillator, connected to said comparator circuit and said first and second mixers, for generating an oscillating control signal as the abnormal condition detection signal for said first and second mixers when an abnormal condition exists.

20. A radio receiver according to claim 12, wherein said first means comprises:
a detector, operatively connected to receive the input signal, for detecting the input signal; and
a transversal filter, operatively connected to said detector, said third means and said fifth means, for equalizing the input signal to reduce distortion and for providing the equalized signal as an output, said fifth means providing the variably phase shifted regenerated clock to said transversal filter so as to provide a phase shifted regenerated clock with a clock phase at which said transversal filter can be operated.

* * * * *